United States Patent [19]

You

[11] Patent Number: 5,169,437
[45] Date of Patent: Dec. 8, 1992

[54] WATER BASED INK COMPOSITIONS EXHIBITING REDUCED CRUSTING, CLOGGING AND KOGATION

[75] Inventor: Young S. You, Los Altos, Calif.

[73] Assignee: Hewlett-Packard Company, Palo Alto, Calif.

[21] Appl. No.: 782,023

[22] Filed: Oct. 24, 1991

[51] Int. Cl.⁵ ............................................. C09D 11/02
[52] U.S. Cl. ............................... 106/20 D; 106/22 R
[58] Field of Search .............................. 106/20, 22, 23

[56] References Cited

U.S. PATENT DOCUMENTS

| | | | |
|---|---|---|---|
| 3,993,492 | 11/1976 | Woolly | 106/19 |
| 4,279,653 | 7/1981 | Makishima et al. | 106/22 |
| 4,308,061 | 12/1981 | Iwahashi et al. | 106/20 |
| 4,986,850 | 1/1991 | Iwata et al. | 106/20 |
| 5,017,227 | 5/1991 | Koike et al. | 106/20 |

FOREIGN PATENT DOCUMENTS

| | | |
|---|---|---|
| 106273 | 8/1980 | Japan. |
| 002373 | 1/1982 | Japan. |
| 076576 | 4/1986 | Japan. |
| 014260 | 1/1990 | Japan. |

*Primary Examiner*—Mark L. Bell
*Assistant Examiner*—Helene Klemanski

[57] ABSTRACT

Disclosed herein are aqueous ink compositions containing a specific humectant or a mixture of such humectants. The use of such humectants in aqueous ink compositions greatly mitigates the problems arising with the crusting and clogging of orifice plates in thermal ink jet printers associated with aqueous ink compositions not employing a humectant. Additionally, the use of such humectants in aqueous ink compositions greatly mitigates the kogation problems arising in thermal ink-jet printers from humectants heretofore employed in aqueous ink compositions.

12 Claims, 1 Drawing Sheet

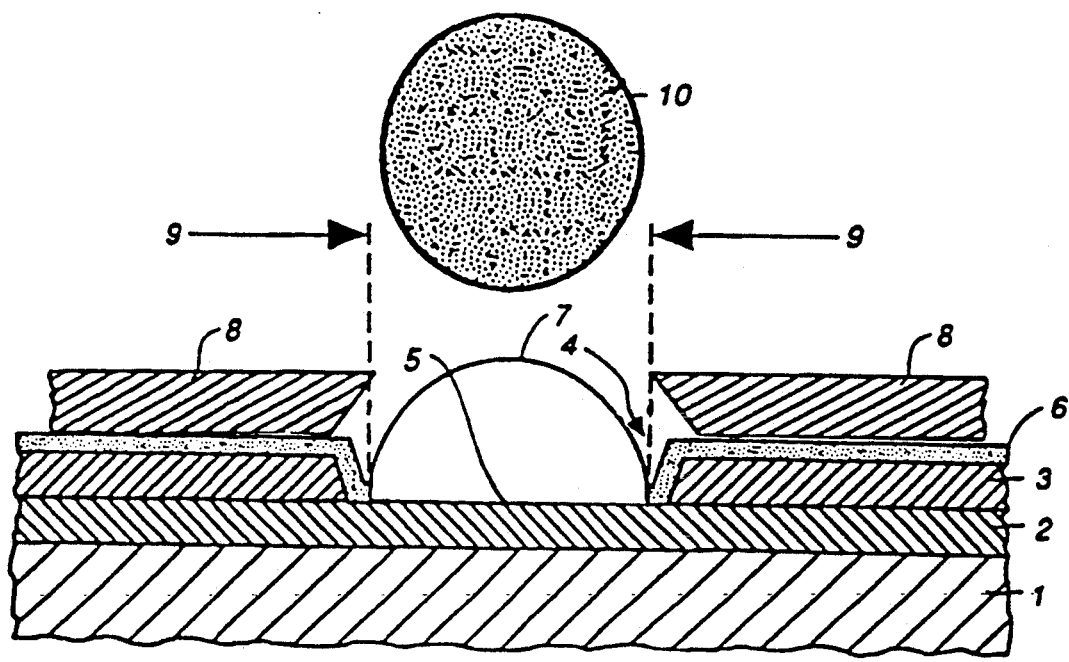
FIG._1

WATER BASED INK COMPOSITIONS EXHIBITING REDUCED CRUSTING, CLOGGING AND KOGATION

BACKGROUND OF THE INVENTION

1. Field of the Invention

The present invention is directed to water based ink compositions suitable for use in thermal ink-jet ink printers. Specifically, the water based ink compositions described in the present invention contain a specific humectant or a mixture of specific humectants. The use of such humectants provide for an ink composition having good print quality in thermal ink-jet ink printers, good drying time and reduced kogation on the resistor surface of the print head of thermal ink-jet ink printers.

2. State of the Art

Aqueous ink-jet ink compositions have been commercially employed in thermal ink-jet printing. Such formulations generally comprise water and a water compatible colorant. The print head of such printers generally comprise a resistor and an orifice plate and, during operation, a drop of ink is formed on the resistor surface. Heating of this drop by the resistor leads to explosive bubble formation which forces the drop of ink from the resistor, through the orifice plate in the print head and onto the substrate.

One of the serious problems encountered in employing aqueous ink-jet ink compositions in thermal ink-jet printing is the difficulty in maintaining the reliability of the printer (i.e., the ability of the printer to provide quality print with minimal shutdown) without sacrificing print quality. Specifically, one concern arises from crusting of the ink composition at the orifice plate of the printer. This concern is compounded by the fact that during operation, the resistor is generally heated to an elevated temperature (e.g., about 300° to about 400° C.) and by the fact that the ink has to pass through very small orifices (about 40 to 70 microns in diameter) in the orifice plate in order to reach the substrate. Accordingly, when used in thermal ink-jet printers, aqueous ink-jet ink compositions are prone to evaporation. Such evaporation leads to unacceptable crusting and clogging of the orifices because the viscosity of the ink composition increases substantially after some of the volatile components have evaporated.

Crusting and clogging of these orifices is unacceptable because it reduces print quality by reducing drop volume delivered to the substrate and ultimately leads to failure of the printer to print which reduces the reliability of the printer.

In order to overcome this problem, it is common to employ a humectant in the aqueous ink-jet ink compositions. The humectant improves the ink composition by reducing the rate of evaporation and accordingly, reduces the crusting and clogging of print head orifices. Suitable humectants heretofore employed in ink compositions include ethylene glycol, propylene glycol and the like.

However, the use of such humectants still leads to reduced print quality in thermal ink-jet printers in spite of the fact that these humectants provide reduced rates of evaporation. Specifically, the addition of such prior art humectants to aqueous ink compositions used in thermal ink-jet printers results in their thermal decomposition on the surface of the resistor. This decomposition leads to residue deposition on the resistor's surface which process is referred to in the art as "kogation". In turn, such deposits act to insulate the thermal heating of ink drops on the resistor surface leading to reduced bubble formation, decreased ejection velocity of the ink drops, and reduced drop volume delivered to the substrate, all of which result in reduced print quality and can eventually lead to bubble formation failure resulting in failure of the thermal ink-jet printer to print.

In view of the above, ink compositions employing humectants which reduce the rate of evaporation of the composition thereby reducing the rate of crusting and clogging of the ink composition at the orifice plates of thermal ink jet printers and which provide reduced kogation problems would be particularly desirable.

SUMMARY OF THE INVENTION

The present invention is directed to the discovery of a new class of humectants. The humectants of this invention provide for aqueous ink compositions having reduced crusting and clogging while also providing for reduced kogation. This new class of humectants are those compounds selected from the group consisting of trimethylol propane [CH$_3$CH$_2$C(CH$_2$OH)$_3$], pentaethylene glycol [HO(CH$_2$CH$_2$O)$_4$CH$_2$CH$_2$OH], and a compound of the formula I:

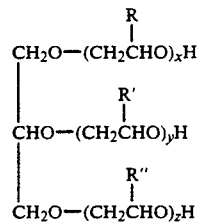

wherein R, R' and R'' are independently selected from the group consisting of hydrogen and methyl and x, y and z are integers equal to at least 1 with the sum of x+y+z being an integer from about 6 to about 30.

While the humectants described above are known compounds having good lubricity, the use of these compounds in aqueous ink compositions, as humectants or otherwise, is believed to be novel.

Accordingly, in one of its composition aspects, the present invention is directed to an aqueous ink composition comprising water, a compatible colorant, and from about 5 to about 20 weight percent of a humectant selected from the group consisting of trimethylol propane, pentaethylene glycol, and a compound of the formula:

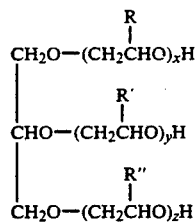

wherein R, R' and R'' are independently selected from the group consisting of hydrogen and methyl and x, y and z are integers equal to at least 1 with the sum of x+y+z being an integer from about 6 to about 30.

In one of its method aspects, the present invention is directed to a method for reducing the rate of evaporation of an aqueous ink composition comprising water and a compatible colorant which method comprises:

(a) selecting a humectant from the group consisting of trimethylol propane, pentaethylene glycol, and a compound of the formula I:

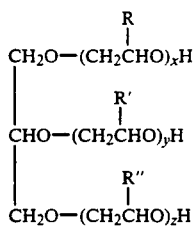

wherein R, R' and R" are independently selected from the group consisting of hydrogen and methyl and x, y and z are integers equal to at least 1 with the sum of x+y+z being an integer from about 6 to about 30; and (b) adding from about 5 to about 20 weight percent of the humectant selected in (a) above to said aqueous ink composition.

Preferably, each of R, R' and R" are either hydrogen or methyl.

BRIEF DESCRIPTION OF THE DRAWING

FIG. 1 is a partial view of the print head of a thermal ink-jet printer and illustrates an ink bubble on the surface of a resistor and the project path of the ink drop (after explosive bubble formation) through the orifices found on the orifice plate of the ink-jet printer.

DETAILED DESCRIPTION OF THE INVENTION

The present invention is directed to aqueous ink compositions containing a humectant or a mixture of humectants that greatly mitigate the problems arising with kogation in thermal ink-jet printers. The aqueous ink compositions of this invention comprise at least three components, namely water, a colorant and a humectant. In a preferred embodiment, the aqueous ink compositions of this invention also contain one or more optional additives such as additives to adjust the viscosity of the ink composition, additives to adjust the surface tension of the composition, and the like.

However, prior to describing this invention in detail, the following terms will first be defined.

1. Definitions

As used herein, the following terms have the following definitions:

The term "compatible colorant" refers to a dye which is compatible (soluble or dispersible) in the aqueous ink composition and which produces a visible colored image on the substrate. The particular colorant employed is not critical provided that the colorant should be stable at the temperature of the printing process, should not chemically react with those portions of the structure that it contacts and should not be poisonous or otherwise noxious.

Suitable colorants include those heretofore used in aqueous ink compositions including, for example, Food Black 2 (available from Mobay Chemical Company) and the like.

The term "aqueous ink composition" refers to an ink composition comprising water, a compatible colorant and a humectant as well as any optional additives. In such compositions, the colorant is generally employed at from about 2 weight percent to about 10 weight percent of solids (i.e., dye) based on the total weight of the ink composition; the humectant is generally employed at from about 5 weight percent to about 20 weight percent based on the total weight of the ink composition; and water is generally employed at from about 68 weight percent to about 93 weight percent based on the total weight of the ink composition.

The term "substrate" refers to the material onto which the ink composition is applied. Suitable substrates are well known in the art and include, for example, paper, polyester, cloth, cardboard, and the like.

2. Synthesis and Methodology

The central aspect of the present invention is the discovery that the addition of certain humectants to an aqueous ink composition greatly mitigate the problems arising with the crusting and clogging of orifice plates in thermal ink jet printers from aqueous ink compositions not containing a humectant as well as greatly mitigate kogation problems arising from aqueous ink compositions containing prior art humectants (e.g., ethylene glycol, propylene glycol, etc.) while providing excellent print quality. As noted above, the humectants employed in the ink compositions described herein are selected from the group consisting of trimethylol propane, pentaethylene glycol, and a compound of the formula I:

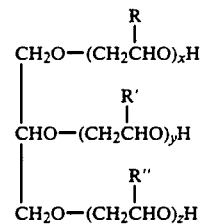

wherein R, R' and R" are independently selected from the group consisting of hydrogen and methyl and x, y and z are integers equal to at least 1 with the sum of x+y+z being an integer from about 6 to about 30. These compounds are either commercially available or can be prepared by art recognized techniques.

Specifically, pentaethylene glycol is commercially available from Aldrich Chemical Company, Milwaukee, Wis., and trimethylolpropane is commercially available from Hoechst-Celanese, Dallas, Tex.

Likewise, compounds of formula I can be prepared by the addition of a requisite amount of alkylene oxide (i.e., ethylene oxide, propylene oxide or a mixture thereof) to glycerol under conditions suitable for formation of the adduct. This preparation of these compounds is well known in the art. Additionally, such compounds are commercially available. For example, compounds of formula I wherein R, R' and R" are hydrogen are commercially available from Lipo Chemicals Inc., Paterson, N.J. 07504 (e.g., a product wherein R, R' and R" are hydrogen and x+y+z=26 is sold by Lipo Chemicals Inc. as Liponic EG-1 and a product wherein R, R' and R" are hydrogen and x+y+z=7 is sold by Lipo Chemicals Inc. as Liponic EG-7).

As is apparent, the compounds of formula I are generally low molecular adducts of an alkylene oxide and glycerol and do not have molecular weights of above about 2000.

A humectant or a mixture of humectants described above is generally added to an aqueous ink composition in an amount sufficient to decrease the rate of evaporation of volatile ink components while maintaining print quality. Preferably, the ink composition contains from about 5 weight percent to about 20 weight percent of humectant based on the total weight of the ink composition. Even more preferably, the ink composition contains from about 5 weight percent to about 10 weight percent of humectant based on the total weight of the ink composition.

The aqueous ink compositions described herein are prepared by combining all of the components and thoroughly mixing the components until a substantially homogeneous composition is achieved. In general, such thorough mixing is accomplished by blending the components to ensure that the composition becomes substantially homogeneous. Blending is generally accomplished by using blenders, magnetic stirrers and the like. Blending is continued for a period of time sufficient to assure substantially homogeneity. The specific time required to achieve a substantially homogenous composition depends on factors such as the amount of composition to be mixed, the mechanical means employed to mix the composition, and the like. However, in a preferred embodiment, such mixing is continued for at least about 1 hour and more preferably for about 2 to about 3 hours.

The mixing is generally conducted at ambient temperatures and pressures although elevated temperatures can be used to facilitate mixing.

In addition to these components, such compositions can contain one or more additives which enhance the ink with regard to (i) improved solubility of other components, (ii) improved print quality (e.g., additives such as water soluble polymeric materials including polypyrollidone can be added to improve print quality), (iii) improved shelf life of the ink [e.g., a biocide such as Proxel GXL (available from ICI, Wilmington, Del.) can be added to improve the shelf life of the ink] and the like. When employed, the total of these additives generally comprise no more than about 2 weight percent of the weight of the total composition.

In a preferred embodiment, the aqueous ink composition is formulated to have a viscosity of from about 2 to about 20 centipoise at 25° C. and, more preferably, from about 2 to about 5 centipoise at 25° C.

In another preferred embodiment, the ink-jet ink composition is formulated to have a surface tension of greater than about 40 dynes per centimeter at 25° C. A particularly preferred composition has a surface tension of from about 40 to about 45 dynes per centimeter at about 25° C.

The viscosity and/or surface tension of the aqueous ink composition can be adjusted by the addition of one or more components well known in the art. For example, if the surface tension of the ink composition is about 30 dynes at 25° C., then additives such as diethylene glycol, ethylene glycol, and the like are known to increase the surface tension of such compositions whereas additives such as surfactants, alcohols, etc. are known to decrease the surface tension.

Similarly, if the viscosity of the ink composition is about 5 centipoise at 25° C., then additives such as polyethylene glycol, polyvinyl alcohol, and the like are known to increase the viscosity of such compositions whereas additives such as N-methyl pyrrolidone and the like are known to decrease the viscosity of such compositions.

This is the appropriate point to note that the viscosity and surface tension values recited herein are recited at 25° C. only for a point of reference. As it is well known in the art, both viscosity and surface tension values are variables depending on the temperature. Accordingly, when employed at the appropriate operating temperatures, the surface tension and viscosity values at the operating temperature will be different from that found at 25° C. However, aqueous ink compositions meeting the defined criteria at 25° C. will also provide for acceptable results at such other operating temperatures.

Aqueous ink compositions containing a humectant or a mixture of humectants as described above can be employed in thermal ink-jet printers. When so employed, the humectant in these ink compositions reduce the rate of evaporation thereby resulting in reduced crusting and clogging of the orifices found in the orifice plate. Likewise, such humectants also reduce kogation on the resistor surface of the thermal ink-jet printer. Without being limited to any theory, it is believed that these humectants do not decompose under the operating conditions of the print head. Such lack of decomposition provides for cleaner resistor surface thereby extending the time during which the printer provides quality printing before shut down for cleaning is necessary.

In this regard, FIG. 1 is a partial view of the print head of a thermal ink-jet printer and illustrates a ink bubble on the surface of a resistor and the projected path of the ink drop (after explosive bubble formation) through the orifices found on the orifice plate of the ink-jet printer. Specifically, in FIG. 1, resistor substrate 1 contains resistor 2 and conductor 3. Conductor 3 is etched to form depression 4 whose bottom 5 is the resistor. Optionally, the surface of conductor 3 is covered with a passivation layer (not shown) which is generally a metal such as gold. An aqueous ink composition 6 is found on the passivation layer found on the surface of conductor as well as on surface 5. Optionally, the print head can contain more than one depression 4 which depressions can be separated by the use of barrier layers (not shown) which extend between conductor 3 and orifice plates 8. Suitable barrier materials include Vacrel which is commercially available from DuPont, Wilmington, Del.

When the resistor is heated, an ink bubble 7 will form on the surface of the ink. In general, ink bubble 7 forms by passing a pulse or pulses of electric current through resistor 2. Typically, sufficient current is pulsed through resistor 2 so as to quickly raise the temperature of the ink in depression 4 to near its superheat limit (e.g., about 300°–400° C.) in about 1–30 microseconds. Under these conditions, the probability of homogenous nucleation of a vapor bubble within the ink approaches unity. Such vapor bubble formation results in expulsion of ink drop 10 along path 9—9 and through the orifice formed by orifice plates 8 and 8 and onto the substrate, e.g., paper (not shown). As is apparent, clogging and crusting of the ink composition occurs at the orifice formed by orifice plates 8 and 8 whereas kogation occurs at bottom surface 5 of depression 4.

The specific thermal ink-jet printer employed with the aqueous ink compositions described herein is not critical and such printers do not form a part of this invention. However, suitable ink-jet printers include those employed in piezoelectric printers, drop on-demand printers, Cannon bubble jet printers, and the like.

The following examples are offered to illustrate the present invention and are not to be construed in any manner as limiting it. In the following examples, all percentages recited are weight percents based on tee total weight of the ink-jet ink composition.

In these examples, Liponic EG-1 was obtained from Lipo Chemicals Inc., Paterson, N.J. 07504 and weight percents of this compound in these examples refer to weight percent of solids. Food Black 2 was obtained from Mobay Chemical Company, Pittsburgh, Pa.

EXAMPLES

Example 1

An aqueous ink composition according to the present invention was prepared by combining 10 weight percent of Liponic EG-1, 4 weight percent Food Black 2 and 86 weight percent water. After combining these components, the resulting solution was stirred at room temperature for 2 hours so as to ensure a homogenous solution.

In addition to the aqueous ink composition described in Example 1 above, other aqueous ink compositions could similarly be prepared by merely substituting a different humectant for the Liponic EG-1 described in Example 1 and/or substituting a different colorant for Food Black 2 described in Example 1. Suitable other humectants which can be substituted for Liponic EG-1 include trimethylol propane, pentaethylene glycol, a compound of the formula I:

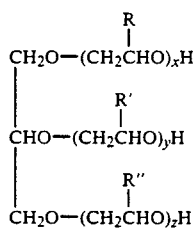

wherein R, R' and R" are independently selected from the group consisting of hydrogen and methyl and x, y and z are integers equal to at least 1 with the sum of $x+y+z$ being an integer from about 6 to about 30, and mixtures of such humectants.

The Liponic EG series are non-toxic and possess exceptional lubricity and, accordingly, are very effective in reducing friction, which can help the ejection of drops out of the nozzles of ink jet heads. They are very stable over a wide range of pH, are soluble in water and alcohol, and can be stored for a long time without any bacteriocide, although the use of bacteriocide in the ink compositions of this invention is contemplated.

The water content of commercially available Liponic EG-1 and EG-7 are about 0.5 and 1% respectively.

Comparative Example A

An aqueous ink composition employing a prior art humectant was prepared by combining 10 weight percent of ethylene glycol, 4 weight percent Food Black 2 and 86 weight percent water. After combining these components, the resulting solution was stirred at room temperature for 2 hours so as to ensure a homogenous solution.

Example 2

The aqueous ink compositions of Example 1 and Comparative Example A were tested for their resistance to crusting and clogging. In particular, each composition was employed in a test referred to as a "De-cap Test". In this test, the ink composition is added to a ink cartridge (print head) which is not capped and which is then used for printing. The length of time required for the pen to first miss a drop of ink is employed to determine the degree of crusting and clogging. The longer the ink composition requires before missing a drop is a measure of its resistance to crusting and clogging.

The results of this test are as follows:

|  | INK COMPOSITION | |
| --- | --- | --- |
|  | EXAMPLE 1 | COMPARATIVE EX. A |
| TIME TO FIRST DROP IS MISSING | >45 seconds | 10-25 seconds |

These results establish that the ink composition of this invention is superior to that using a prior art humectant in its resistance to crusting and clogging.

Example 3

The aqueous ink compositions of Example 1 and Comparative Example A were tested for their resistance to kogation. In particular and as noted above, kogation results in the formation of smaller bubbles in the ink drop formed on the surface of the resistor. In turn, such smaller bubble formation results in a reduction of the velocity of the ink drop emitted from the print head. Accordingly, kogation can be indirectly measured by measuring the variation over time in velocity of the drop ejected from the print head with greater drops in velocity over time reflecting more kogation on the surface of the resistor.

The results of this test are as follows:

|  | INK COMPOSITION | |
| --- | --- | --- |
|  | EXAMPLE 1 | COMPARATIVE EX. A |
| CHANGE IN DROP VELOCITY (OVER 3 HOURS) | 5-10% | 20-30% |

These results establish that the ink composition of this invention is superior to that using a prior art humectant in the degree of kogation formed on the surface of the resistor over time.

In addition to the improvements in kogation and crusting/clogging, the ink composition of Example 1 was found to provide improved print quality as compared to the ink composition of Comparative Example A. This improvement in print quality was particularly evident in reduced feathering of the ink composition of Example 1 as compared to the ink composition of Comparative Example A.

A typical ink composition described by this invention contains, for example, 2-5 weight percent food black; 5-15 weight percent Liponic EG-1; and the balance deionized water.

What is claimed is:

1. An aqueous ink composition suitable for use in a thermal ink-jet printer which consists essentially of water, a compatible colorant, and from about 5 to about 20 weight percent of a compound of the formula I:

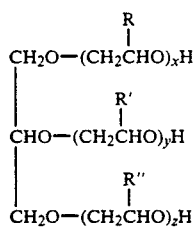

wherein R, R' and R" are independently selected from the group consisting of hydrogen and methyl and x, y and z are integers equal to at least 1 with the sum of x+y+z being an integer from about 6 to about 30, and mixtures of such compounds.

2. A composition according to claim 1 wherein R, R' and R" are hydrogen and the sum of x+y+z being an integer equal to 7 or to 26.

3. A composition according to claim 1 wherein the ink composition has a viscosity at 25° C. of from about 2 to about 20 centipoise and a surface tension at 25° C. of greater than about 40 dynes per centimeter.

4. A method for reducing the rate of evaporation of an aqueous ink composition consisting essentially of water, a humectant and a compatible colorant which method comprises:

(a) selecting a humectant from a compound of the formula I:

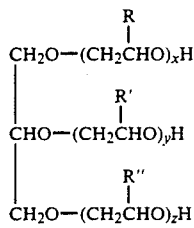

wherein R, R' and R" are independently selected from the group consisting of hydrogen and methyl and x, y and z are integers equal to at least 1 with the sum of x+y+z being an integer from about 6 to about 30; and (b) adding from about 5 to about 20 weight percent of the humectant selected in (a) above to an aqueous ink composition comprising water and a compatible colorant.

5. A method according to claim 4 wherein R, R' and R" are hydrogen and the sum of x+y+z is equal to 7 or to 26.

6. A method according to claim 4 wherein the ink composition has a viscosity at 25° C. of from about 2 to about 20 centipoise and a surface tension at 25° C. of greater than about 40 dynes per centimeter.

7. A method for reducing kogation in a thermal ink-jet printer using an ink composition comprising water, a compatible colorant and a humectant wherein kogation arises from the thermal decomposition of the humectant which method comprises:

(a) selecting a humectant from the group consisting of trimethylol propane and a compound of the formula I:

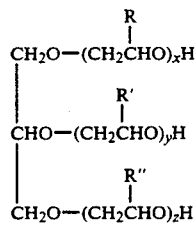

wherein R, R' and R" are independently selected from the group consisting of hydrogen and methyl and x, y and z are integers equal to at least 1 with the sum of x+y+z being an integer from about 6 to about 30;

(b) adding from about 5 to about 20 weight percent of the humectant selected in (a) above to an aqueous ink composition comprising water and a compatible colorant; and (c) using the aqueous ink composition produced in step (b) in a thermal ink-jet printer.

8. A method according to claim 7 wherein the humectant is a compound of Formula I.

9. A method according to claim 8 wherein R, R' and R" are hydrogen and the sum of x+y+z is equal to 7 or to 26.

10. A method according to claim 7 wherein the humectant is trimethylol propane.

11. A method according to claim 7 wherein the ink composition produced in step (b) has a viscosity at 25° C. of from about 2 to about 20 centipoise and a surface tension at 25° C. of greater than about 40 dynes per centimeter.

12. An aqueous ink composition comprising water, a compatible colorant, and from about 5 to about 20 weight percent of a humectant of the formula:

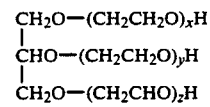

wherein x, y and z are integers equal to at least 1 with the sum of x+y+z being an integer equal to 7 or to 26 and wherein said ink composition has a viscosity at 25° C. of from about 2 to about 20 centipoise and a surface tension at 25° C. of greater than about 40 dynes per centimeter.

* * * * *